United States Patent [19]

Morello

[11] 4,420,608
[45] Dec. 13, 1983

[54] POLYAMIDES FROM ITACONIC ACID AND DIAMINES

[75] Inventor: Edwin F. Morello, Naperville, Ill.

[73] Assignee: Standard Oil Company (Indiana), Chicago, Ill.

[21] Appl. No.: 327,605

[22] Filed: Dec. 4, 1981

Related U.S. Application Data

[62] Division of Ser. No. 211,587, Dec. 1, 1980.

[51] Int. Cl.$^3$ ............................................. C08G 69/14
[52] U.S. Cl. .................................. 528/324; 528/183; 528/192; 528/220; 528/310; 528/323; 528/329; 528/326; 528/339; 528/340; 528/345; 528/337
[58] Field of Search ............... 528/345, 183, 220, 337, 528/324, 339, 340, 323, 326, 310, 192, 329

[56] References Cited

U.S. PATENT DOCUMENTS

| | | | |
|---|---|---|---|
| 2,174,619 | 10/1939 | Carothers | 528/345 |
| 3,239,491 | 3/1966 | Tsou et al. | 528/345 |
| 3,260,691 | 7/1966 | Lavin et al. | 528/350 |
| 3,347,828 | 10/1967 | Stephens et al. | 528/350 |
| 3,494,890 | 2/1970 | Morello | 528/350 |
| 3,645,900 | 2/1972 | Ohm et al. | 528/331 |
| 3,661,832 | 5/1972 | Stephens | 528/350 |
| 3,732,188 | 5/1973 | Holub et al. | 528/345 |
| 4,016,140 | 4/1977 | Morello | 528/350 |

FOREIGN PATENT DOCUMENTS 570858  7/1945  United Kingdom .

*Primary Examiner*—Harold D. Anderson
*Attorney, Agent, or Firm*—Gunar J. Blumberg; William T. McClain; William H. Magidson

[57] ABSTRACT

Novel polyamides are prepared for itaconic acid, other diacids and diamines. These polyamides are useful as molded objects, fibers, films, laminates and coatings.

12 Claims, No Drawings

POLYAMIDES FROM ITACONIC ACID AND DIAMINES

This is a division of application Ser. No. 211,587, filed Dec. 1, 1980.

BACKGROUND OF THE INVENTION

1. Field of the Invention

The field of this invention relates to polyamides prepared from itaconic acid and diamines. These novel polyamides are useful in preparing molded articles, fibers, laminates and coatings.

2. Background

It is known to make polyamide-imides from trimellitic anhydride chloride and aliphatic or aromatic diamines in polar solvents. (See U.S. Pat. Nos. 3,661,832 and 3,260,691.) The hydrochloric acid produced in this process is removed by precipitation of the polymer in a precipitant such as water. Alternatively, U.S. Pat. No. 3,347,828 shows that the hydrochloric acid may be neutralized by adding alkaline oxides. British Patent Specification 570,858 discloses various processes for making fiber forming polyamides. In reviewing the references, it is clear the use of itaconic acid to form polyamides useful as moldings, fibers, laminates, and coatings has not been contemplated in the prior art.

The general object of this invention is to provide novel polyamides based on itaconic acid and diamine moieties. A more specific object of this invention is to provide polyamides from itaconic acid moieties and aliphatic, cycloaliphatic, araliphatic and aromatic moieties. Another object is to provide a process for the manufacture of polyamides, from itaconic acid and diamines.

We have found that novel polyamides can be formed by reacting itaconic acid with diamines. Itaconic acid reacts readily with the diamine to form a pyrrolidone which polycondenses to a high molecular weight polyamide. In the novel process both aliphatic and aromatic diamines can be polymerized with itaconic acid in the melt to form high molecular weight polyamides.

Our process for the manufacture of the novel polyamides comprises reacting about equal molar amounts of itaconic acid with a primary diamine or a mixture of primary diamines. The molecular ratio of the itaconic acid to the primary diamine may be in the range of 0.95 to 1.10, preferably in the range of 0.98 to 1.05. In the preferred method, the reaction is carried out under pressure in the presence of water to facilitate the formation of the pyrrolidone. The water is then distilled and the temperature is raised from about 150° F. to 525° F. to complete the polycondensation. The polycondensation can suitably be carried out at a temperature of 475° F. to 550° F., preferably at a temperature of 500° to 525° F. The order of addition of the reactants is not critical and all the reactants can be added simultaneously in any order desired. The novel polyamides of this invention have the following recurring structure wherein R is a divalent aliphatic or aromatic hydrocarbon radical.

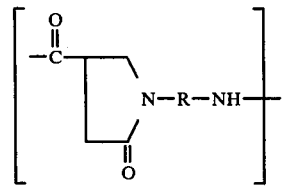

The radical R may be a divalent aliphatic hydrocarbon of 2 to 18 carbon atoms or an aromatic hydrocarbon from 6 to 20 carbon atoms, or an aromatic hydrocarbon radical containing from 6 to 10 carbon atoms joined directly or by stable linkage comprising —O—, methylene,

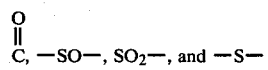

radicals.

The radical R is derived from aliphatic, araliphatic or cycloaliphatic diamines such as ethylenediamine, propylenediamine, 2,2-dimethylpropylene diamine, tetramethylene diamine, hexamethylene diamine, octamethylene diamine, nonamethylene diamine, decamethylene diamine, dodecamethylenediamine, 4,4'-diaminodicyclohexylmethane, xylylene diamine and bis (aminomethyl) cyclohexane. Suitable aromatic diamines useful in applicant's process include para- and meta-phenylenediamine, oxybis (aniline), thiobis (aniline), sulfonylbis (aniline), diaminobenzophenone, methylenebis (aniline), benzidine, 1,5-diaminonaphthalene, oxybis (2-methylaniline), thiobis (2-methylaniline), and the like. Examples of other useful aromatic primary diamines are set out in U.S. Pat. Nos. 3,494,890 (1970) and U.S. Pat. No. 4,016,140 (1972) both incorporated herein by reference.

In some cases the polyamide may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the polyamide and can be conducted in several ways. However all techniques require heating the ground or pelletized polyamide below the melting point of the polyamide, generally at a temperature of about 180° C. to 225° C. while either sparging with an inert gas such as nitrogen or air or operating under vacuum. In cases where the polyamides have a low melt temperature, they can be polymerized in the melt under vacuum in thin sections or using thin film reactors known in the art.

Injection molding of the novel polyamide is accompanied by injecting the polyamide into a mold maintained at a temperature of about 45° F. to 300° F. In this process a 20 second to 1 minute cycle is used with a barrel temperature of about 450° F. to 600° F. The latter will vary depending on the $T_g$ of the polymer being molded.

The novel polyamides have excellent mechanical and thermal properties and can readily be molded, formed into fibers, films, laminates or coatings. The tensile properties of the polyamides made with several diamines are shown on Table I. Tensile strength of 7,000 to 12,000 psi indicates that high molecular weight polyamides are formed. Infrared spectra of the polyamides has confirmed the polyamide structure and also shows the absence of any imide structure or unsaturation in the polyamides. Carbonyl band heights are also consistent with two types of amide groups in the polyamide, the two types are secondary and tertiary amide groups. Characteristic absorption bands are shown in Example I for the itaconic acid/hexamethylene diamine polymer.

Thermal analysis of the hexamethylenediamine itaconic acid polyamide by thermal gravimetric analysis shows excellent stability. This is demonstrated by the fact that under nitrogen atmosphere the main weight loss occurs at a temperature of 330° centigrade and 1% additional weight loss occurs at a temperature of about 397° centigrade. Glass temperature ($T_g$) of the polyamide varied with the particular diamine used as shown in Table I. Values range from a $T_g$ of 22° C. for a polyamide prepared from dodecanediamine and itaconic acid and increase to 128° and 160° centigrade for polyamides made from itaconic acid and m-bis(aminomethyl)cyclohexane, and m-xylylenediamine.

Diamines with the amino groups attached directly to the aromatic ring are suitably polymerized with itaconic acid by solution condensation in organic polar solvents. Useful polar solvents include N,N-dimethylacetamide, N-methylpyrrolidone, N,N-dimethylformamide, dimethylsulfoxide and the like. Polyamides made from itaconic acid and aliphatic diamines show high moisture pick up. Sometimes up to seventy-five percent of weight of these polyamides is increased by moisture pick up. The polyamides are useful in fiber applications to modify nylon 6,6 by copolymer formation.

The itaconic acid polyamide can be used to prepare copolymides containing about 2-70% of the itaconic acid polyamide and the remainder being dibasic acids or lactams as comonomers. Suitable dibasic acids are adipic acid and related aliphatic acids. Suitable lactams are caprolactam, etc.

The following examples illustrate the preferred embodiment of the invention. It will be understood that the examples are for illustrative purposes only and do not purport to be wholly definitive with respect to conditions or scope of the invention.

EXAMPLE 1

HMDA/ITA Polymers

In a 1-gallon 4CV-Helicone reactor equipped with nitrogen purge and a therminol heating system were placed 243.7 g (1.874 moles) of itaconic acid, 313.4 g (1.926 moles) of a 71.4% aqueous solution of hexamethylene diamine, 4.56 g (2 mole %) benzoic acid end-capping agent and 100 ml of water. The reactor was first purged of air by use of purified nitrogen. The agitor blades were then set as 45 RPM and heating begun. The temperatures was raised to 205° F. and held 20 minutes to affect addition to the double bond. Over a 37-minute period temperature was then increased to 400° F. and pressure in the system allowed to reach 130 psi. RPM was adjusted to prevent foaming and temperature gradually increased over 28 minutes to 520° F. Pressure was simultaneously reduced to 100 psi and maintained allowing water to distill from the reactor. Pressure was reduced over 35 minutes to 1 atmosphere by venting steam from the system. A nitrogen purge was started to sweep water of reaction continuously from the reactor. A melt temperature of 510°-525° F. was maintained for 30 minutes and the product was discharged from the reactor onto metal foil cooled with dry ice. Polymer inherent viscosity was 1.13 dl/g. measured at 30° C. in 60/40 Phenoltetrachloroethane indicating high molecular weight polymer formed. The polymer was molded in an Arburg Molder after drying overnight at 50° C. and 0.1 mm Hg vacuum. Properties of the molded polymer are shown in Table I.

Films of the polymer were cast from N-methylpyrrolidone solvent directly on KBr plates and the solvent removed at 100° C. under vacuum. Infrared spectra run on thick and thin films had the following characteristics:

| Absorption Bands | Identification |
|---|---|
| 1670 cm$^{-1}$ | Secondary Amide |
| 1550 cm$^{-1}$ | Broad carbonyl absorbance with a shoulder indicates two different amides with the cyclic amide at a higher frequency. |

The absence of both imide absorption at 1695 and 1775 cm$^{-1}$ and double bond absorption in the 800 to 1100 cm$^{-1}$ region demonstrates the absence of these groups in the polymr.

EXAMPLE 2 m-Xylylenediamine/ITA—Polymer

In this example the polymer was prepared by sequentially reacting ITA and diamine as follows to form an ordered polymer structure. The procedure in Example 1 was followed except 360.6 g (2.772 moles) of itaconic acid was reacted 2 hrs. at 100° C. with 194.7 g (1.424 moles) of m-xylylenediamine (99.63% purity) in 281 cc water. Another charge of MXDA of 194.7 g was then added and reaction continued essentially as in Example 1. A final melt temperature of 514° F. was reached and the polymer melt with nitrogen purge was held the usual 30 min. After discharge from the reactor and grinding in a Wiley Mill, the polymer inherent viscosity was 0.41 dl/g and had to be solid state-polymerized to higher mol. wt. for molding. The polymer of 6 mesh after 16 hrs. at 200° C. had an inherent viscosity of 0.59 dl/g measured at 30° C. in 60/40 Phenol/TCE (0.5 g/100 ml.). The product had agglomerated slightly and was reground through a 9 mesh screen for molding. The properties of the polymer shown in Table I are similar to the random polymer of Example 4, but are somewhat higher in stiffness based on Moduli and heat deflection data.

EXAMPLES 3-5

The examples referred to were carried out in a manner identical to Example 1 using the diamines shown in Table I. The initial polymers of intermediate molecular weight determined by inherent viscosity were solid-state polymerized at 200° C. (under high vacuum to raise the polymer mol. wt. for molding. Most of the polymers were molded in the Arburg injection molding machine at 450°-575° F. depending on the melt temperature of the polymer. Where indicated, some of the polymers were compression-molded in ⅛ inch thick discs 5.90 inches in diameter. The latter were then cut-up for ASTM property testing.

EXAMPLE 6

Methylene bis(aniline)/ITA

The procedure of this example will serve as a model for diamines yielding high melting polymer non-melt processable by the method of Example 1. A solution of 99.1 g (0.5 moles) of methylene-bis(aniline) in 225 g of N-methyl-pyrrolidone solvent was heated to 90° C. and 65.06 g (0.5 moles) of itaconic acid added in portions over 10 minutes. Heating at this temperature was continued for 20 minutes and temperature then raised to the boiling point of the mixture (170°–180° C.) for 1 hour. The solution was slightly viscous when cooled to room temperature and was used to impregnate fiber glass cloth for preparing glass laminates. the glass prepregs were precured ½ hour at 400° F. to remove solvent and then multi-layers were pressed into a mold 1 hour at 500°–525° F. under 2000–40000 psi pressure. The molded specimens had a density of 1.85 and were 50% glass. The molded laminate had a flexural strength of 14,900 psi and a modulus of 1.57 million psi. High stiffness is also indicated by a deflection temperature of 580° F.

EXAMPLE 7

HMDA/ITA/Adipic Acid Copolymer

This example illustrates the use of itaconic acid for modifying conventional polyamides to enhance moisture absorption for such applications as films and fibers where higher water levels are desirable. A nylon 6,6 copolymer containing 20 mole % itaconic acid was prepared in a 4CV Helicone reactor similar to Example 1 except 327.9 g (2.822 moles) of a 70.1% solution of hexamethylene diamine was reacted with 72.1 g (0.554 moles) of itaconic acid and 324.05 g (2.217 moles) adipic acid in 280 ml. of water. After an initial 20 minute hold period at 205° F. to react the double bond, temperature was raised in stages to 377° F. over 25 minutes. Pressure in the system reached 130 psi and was maintained by venting water from the system. After 13 minutes, temperature was increased to 510°–515° F. and pressure reduced to 100 psi. Distillation of water continued until 477 ml water was removed. Pressure was reduced to 1 atmosphere over 5 minutes by venting steam and mixing continued 30 minutes with a nitrogen purge to continuously remove water of reaction. The highly viscous melt was discharged from the reactor onto metal foil cooled with dry-ice. The polymer was ground cold and dried overnight at 120° C. in a high vacuum oven for molding. The polymer had an inherent viscosity of 1.21 dl/g measured at 30° C. in 60/40 phenol/tetrachloroethane.

Properties of the molded polymer shown in Table I are similar to nylon 6,6 except for higher moisture absorption. In the 24 hr. immersion test 5.2% water absorption compares with 1.5% for the nylon 6,6 homopolymer. Glass temperature ($T_g$) was unchanged from nylon 6,6 and the crystalline character of the nylons was retained with copolymer formation. Temperature of crystallization from the melt ($T_c$) was lowered 48° C. to 186° C., however.

TABLE I

| Properties of Itaconic Acid Polyamides | | |
|---|---|---|
| Example No. | Diamine Reactant | Polymer I.V. |
| 1 | HMDA[1] | 1.13 |
| 2 | MXDA[1] | 0.59[3] |
|   | Ordered Polymer | |
| 3 | 1,3-BAC[2] | 0.99[3] |
| 4 | MXDA[1] | 0.86[3] |
| 5 | 1,12-dodecane diamine[1] | 0.73 |
| 7 | HMDA[4] Copolyamide | 1.20 |

| Tensile Properties | | | |
|---|---|---|---|
| ASTM Method D-638 | | | IZOD ASTM |
| Ten. Str. psi | % Elong. | TIS | Method D-752 |
| 9140 | 136.6 | 64.4 | 0.95 |
| 12045 | 3.1 | 12.6 | 0.97 |
| 6940 | 4.0 | — | — |
| 11735 | 4.6 | — | — |
| 4540 | 365.0 | 34.3 | 0.56 |
| 10875 | 18.0 | — | 0.84 |

[1]Injection Molded
[2]Compression Molded
[3]Solid State Polymerized 16 hrs./200° C.
[4]Copolyamide with 20/80 mole ratio with ITA/Adipic Acid
Abbreviations:
HMDA—Hexamethylenediamine
MXDA—M—Xylylenediamine
BAC—bis(aminomethyl)cyclohexane
ITA—Itaconic Acid
Tg—Glass transition temperature
Tc—Crystallization temperature

| Example No. | Tc | Tg | Water Absorp. % Sat. (24 hrs. immersion) |
|---|---|---|---|
| 1 | — | 64° C. | >65 (12.75) |
| 2 | — | — | — |
| 3 | — | 160 | 40.7 |
| 4 | — | 128 | (2.5) |
| 5 | — | 22 | 3.5 (0.78) |
| 7 | 186° C. | 48 | 12.9 (5.2) |

| Flexural Properties | | |
|---|---|---|
| Flex. Str. psi | Modulus (× $10^{-6}$ psi) | HDT, °F. |
| 12800 | 0.363 | 127 |
| 20300 | 0.709 | 257 |
| 14900 | 0.554 | 306 |
| 24300 | 0.654 | 251 |
| — | 0.095 | $T_m$ = 115 |
| 16530 | 0.434 | 120 |

I claim:

1. A solid copolyamide containing 2–75 percent of the recurring units of the following recurring structure:

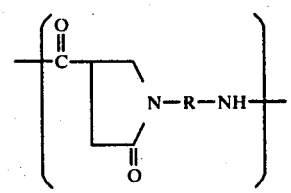

the remaining recurring units are based on the copolymerization of at least one dibasic acid or at least one lactam with at least one primary diamine or a mixture of primary diamines and wherein R is a divalent aliphatic or aromatic hydrocarbon radical.

2. A solid copolyamide containing 2–75 percent of the recurring units of the following recurring structure:

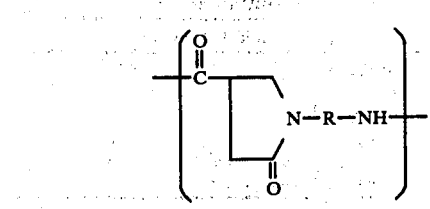

wherein the remaining recurring units are based on the copolymerization of adipic acid with a primary diamine or a mixture of primary diamines and wherein R is a divalent aliphatic or aromatic hydrocarbon radical.

3. A solid copolyamide containing 2-75 percent of the recurring units of the following recurring structure:

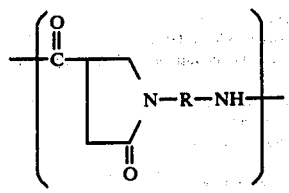

wherein the remaining recurring units are based on the copolymerization of caprolactam with a primary diamine or a mixture of primary diamines and wherein R is a divalent aliphatic or aromatic hydrocarbon radical.

4. The copolymer of claim 1, wherein R is an aliphatic hydrocarbon radical having from about 2 to about 18 carbon atoms.

5. The copolymer of claim 1, wherein R is an aromatic hydrocarbon radical having from about 6 to about 20 carbon atoms.

6. The copolymer of claim 1, wherein the aromatic hydrocarbon radical having from about 6 to about 10 carbon atoms is joined directly or by stable linkage consisting of $$-O-, \text{methylene}, -\overset{\overset{O}{\|}}{C}-, -SO-, -SO_2-, \text{and} -S-$$

radicals.

7. The copolymer of claim 2, wherein R is an aliphatic hydrocarbon radical having from about 2 to about 18 carbon atoms.

8. The copolymer of claim 2, wherein R is an aromatic hydrocarbon radical having from about 6 to about 20 carbon atoms.

9. The copolymer of claim 2, wherein the aromatic hydrocarbon radical having from about 6 to about 10 carbon atoms is joined directly or by stable linkage consisting of $$-O-, \text{methylene}, -\overset{\overset{O}{\|}}{C}-, -SO-, -SO_2-, \text{and} -S-$$

radicals.

10. The copolymer of claim 3, wherein R is an aliphatic hydrocarbon radical having from about 2 to about 18 carbon atoms.

11. The copolymer of claim 3, wherein R is an aromatic hydrocarbon radical having from about 6 to about 20 carbon atoms.

12. The copolymer of claim 3, wherein the aromatic hydrocarbon radical having from about 6 to about 10 carbon atoms is joined directly or by stable linkage consisting of $$-O-, \text{methylene}, -\overset{\overset{O}{\|}}{C}-, -SO-, -SO_2-, \text{and} -S-$$

radicals.

* * * * *

UNITED STATES PATENT OFFICE
CERTIFICATE OF CORRECTION

Patent No. 4,420,608                    Dated December 13, 1983

Inventor(s)  Edwin F. Morello

It is certified that error appears in the above-identified patent and that said Letters Patent are hereby corrected as shown below:

Patent reads:

| Col. | Line | |
|---|---|---|
| 3 | 54 | "as" should read --at-- |
| 3 | 55 | "temperatures" should read --temperature-- |
| 5 | 18 | "40000" should read --4000-- |
| 6 | 24 | "M--Xylylenediamine" should read --M-Xylylenediamine-- |

Signed and Sealed this

Eighteenth Day of September 1984

[SEAL]

Attest:

GERALD J. MOSSINGHOFF

Attesting Officer          Commissioner of Patents and Trademarks